United States Patent
Gupta et al.

(10) Patent No.: US 8,422,477 B2
(45) Date of Patent: Apr. 16, 2013

(54) METHODS AND APPARATUS FOR RF CHANNEL SWITCHING IN A MULTI-FREQUENCY NETWORK

(75) Inventors: Binita Gupta, San Diego, CA (US); An Mei Chen, San Diego, CA (US); Linbo Li, San Diego, CA (US); Raghuraman Krishnamoorthi, San Diego, CA (US); Ashok Mantravadi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 820 days.

(21) Appl. No.: 12/055,981

(22) Filed: Mar. 26, 2008

(65) Prior Publication Data

US 2009/0080378 A1    Mar. 26, 2009

Related U.S. Application Data

(60) Provisional application No. 60/909,931, filed on Apr. 3, 2007.

(51) Int. Cl.
*H04J 1/00*    (2006.01)

(52) U.S. Cl.
USPC ........................................................ 370/343

(58) Field of Classification Search .................. None
See application file for complete search history.

(56) References Cited

U.S. PATENT DOCUMENTS

| 7,421,272 B2 | 9/2008 | Dalsgaard et al. |
| 2003/0134622 A1 | 7/2003 | Hsu et al. |
| 2004/0202140 A1 | 10/2004 | Kim et al. |
| 2006/0034205 A1 | 2/2006 | Kim |

(Continued)

FOREIGN PATENT DOCUMENTS

| CN | 1551677 A | 12/2004 |
| EP | 1467586 A2 | 10/2004 |

(Continued)

OTHER PUBLICATIONS

ETSI TS 125 331 v7.3.0; "Universal Mobile Telecommunications System (UMTS); Radio Resource Control (RRC); Protocol-Specification-(3GPP TS 25.331 v7:3.0 Release 7)," 3GPP Technical Specification, pp. 427(line 32)-429(line 57), XP014040018, Section 10.2. 16k MBMS Neighbouring Cell p-t-m rb Information, ISSN: 0000-001, Dec. 2006.

(Continued)

*Primary Examiner* — Anh-Vu Ly
(74) *Attorney, Agent, or Firm* — Fulbright & Jaworski L.L.P.

(57) ABSTRACT

Methods and apparatus for RF channel switching in a multi-frequency network. In an aspect, a method includes identifying a local area operations infrastructure (LOI) in the multi-frequency network, generating a channel description message that associates at least one descrambling sequence identifier with each RF channel associated with the LOI, respectively, and distributing the CDM over the LOI. In another aspect, a method includes receiving a CDM that associates at least one descrambling sequence identifier with each RF channel available in a LOI, detecting an RF channel switch event that identifies a selected RF channel, determining a selected descrambling sequence identifier from the CDM based on the selected RF channel, switching to the selected RF channel wherein the selected descrambling sequence identifier identifies a selected descrambling sequence to descramble desired content carried on the selected RF channel, and acquiring the desired content on the selected RF channel.

53 Claims, 9 Drawing Sheets

U.S. PATENT DOCUMENTS

| | | | | |
|---|---|---|---|---|
| 2006/0120523 | A1* | 6/2006 | Kurotaki | 380/201 |
| 2008/0095122 | A1* | 4/2008 | Khandekar et al. | 370/335 |
| 2008/0259858 | A1* | 10/2008 | Gupta et al. | 370/329 |
| 2008/0259911 | A1* | 10/2008 | Gupta et al. | 370/356 |
| 2008/0261547 | A1* | 10/2008 | Gupta et al. | 455/161.1 |
| 2009/0010225 | A1* | 1/2009 | Gupta | 370/331 |
| 2009/0016380 | A1* | 1/2009 | Gupta et al. | 370/480 |
| 2009/0029709 | A1 | 1/2009 | Gupta et al. | |
| 2009/0197604 | A1* | 8/2009 | Gupta et al. | 455/436 |
| 2009/0199244 | A1 | 8/2009 | Woch et al. | |
| 2009/0225872 | A1 | 9/2009 | Simon | |
| 2009/0274119 | A1* | 11/2009 | Gupta et al. | 370/331 |
| 2010/0056166 | A1 | 3/2010 | Tenny | |

FOREIGN PATENT DOCUMENTS

| | | |
|---|---|---|
| EP | 1513368 A2 | 3/2005 |
| GB | 2407002 | 4/2005 |
| JP | 2002353915 A | 12/2002 |
| JP | 2009522947 A | 6/2009 |
| KR | 20040077725 | 9/2004 |
| KR | 20040087830 A | 10/2004 |
| WO | WO03063418 | 7/2003 |
| WO | WO03065751 | 8/2003 |
| WO | WO2005011157 | 2/2005 |
| WO | 2005043829 | 5/2005 |
| WO | WO2005055473 A1 | 6/2005 |
| WO | WO2005117297 | 12/2005 |
| WO | WO2006014092 A1 | 2/2006 |
| WO | WO2006110445 A1 | 10/2006 |
| WO | WO2006134449 A2 | 12/2006 |

OTHER PUBLICATIONS

International Search Report-PCT/US2008/058524, International Searching Authority-European Patent Office-Sep. 3, 2008.

Written Opinion-PCT/US2008/058524, International Searching Authority-European Patent Office-Sep. 3, 2008.

UMTS Networks, Architecture, Mobility and Services, pp. 47-50, 55-57, 64, 90, 93 UMTS Networks, Architecture, Mobility and Services, WLEY, US, XP002491350.

UMTS Networks, Architecture, Mobility and Services, pp. 47-50, 55-57, 64, 90, 93 UMTS Networks, Architecture, Mobility and Services, Wley, US, XP002491350, Mar. 2005.

Taiwan Search Report—TW097112381—TIPO—Nov. 22, 2011.

Maeda S., "4-5. Multichannel Broadcast Service for Cellular Phones: MediaFLO," Journal of the Institute of Image Information and Television Engineers, Japan, May 1, 2006, vol. 60, No. 5, pp. 725-727.

Mayeda, S, "Mobile Communication Technology and Mobile Application Provided by Qualcomm," Japan, Qualcomm Japan Incorporated, Sep. 8, 2006, pp. 18-27.

URL, http://www.veriserve.co.jp/jp/seminer/seminer_list/pdf/06.09.08_maeda.pdf.

QUALCOMM Proprietary, "MediaFLO", Jul. 26, 2006, URL, http://wiki.nectec.or.th/gitiwiki/pub/Knowledge/PresentationFromICTExpoForum/mediaflo.pdf.

TIA-1099, "Forward Link Only Air Interface Specification for Terrestrial Mobile Multimedia Multicast" Oct. 2006.

* cited by examiner

METHODS AND APPARATUS FOR RF CHANNEL SWITCHING IN A MULTI-FREQUENCY NETWORK

CLAIM OF PRIORITY UNDER 35 U.S.C. §119

The present Application for Patent claims priority to Provisional Application No. 60/909,931 entitled "Methods and Apparatus for Providing RF Switch in a Multiple Frequency Network," filed Apr. 3, 2007, and assigned to the assignee hereof and hereby expressly incorporated by reference herein.

BACKGROUND

1. Field

The present application relates generally to the operation of data networks, and more particularly, to methods and apparatus for RF channel switching in a multi-frequency network.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is important for network operators, content retailers, and service providers to have a way to distribute content and/or other network services in a fast and efficient manner and in such a way as to increase bandwidth utilization and power efficiency.

A multi-frequency network (MFN) is a network in which multiple radio frequencies (RFs) (or RF channels) are used to transmit media content. One type of MFN is a horizontal multi-frequency network (HMFN) where a distribution waveform is transmitted over different RF channels in different local areas. The same or different content may be transmitted as part of a distribution waveform carried over different RF channels in such local areas. Another type of MFN is a vertical multi-frequency network (MFN) in which multiple radio frequency (RF) channels are used in a given local area to transmit independent distribution waveforms with an aim to increase the capacity of the network (in terms of the ability to deliver more content to a device/end user). An MFN deployment may also consist of VMFN in certain areas and HMFN in certain other areas.

In a typical VMFN, a local area operations infrastructure (LOI) comprises transmitting sites that operate to transmit multiple distribution waveforms over multiple RF channels in a selected geographic area. Each distribution waveform may comprise one or more content flows that can be selected at a receiving device for rendering. Adjacent LOIs may utilize the same or different RF channels.

Unfortunately, conventional systems may perform spurious RF channel switches when a receiving device attempts to switch from a first RF channel (RF1) to a second RF channel (RF2) in a given LOI. For example, when a device attempts to switch to the second RF channel to receive a desired content flow, the device may unintentionally switch to a neighboring LOI that also transmits content on the second RF channel, but that content is different from the content transmitted in the current LOI. If the device is in an area where the two LOIs provide overlapping coverage, the second RF channel from the neighboring LOI may be received with higher power than the second RF channel transmitted in the current LOI. As a result, a spurious RF channel switch may occur because the device may attempt to process the distribution waveform that it received with the higher power from the neighboring LOI. However, if this happens, the device will be unable to find the desired content flow on that distribution waveform because the neighboring LOI transmits different content on the second RF channel than what is transmitted in the current LOI.

Therefore, it would be desirable to have a system that operates to reduce or eliminate spurious RF channel switches and thereby facilitate fast RF channel switching capabilities in a multi-frequency network.

SUMMARY

In one or more aspects, a switching system, comprising methods and apparatus, operates to provide fast and efficient RF channel switching in a multi-frequency network while reducing or eliminating spurious RF channel switches.

In an aspect, a method is provided for RF channel switching in a multi-frequency network. The method comprises identifying a LOI in the multi-frequency network, generating a channel description message (CDM) that associates at least one descrambling sequence identifier with each RF channel associated with the LOI, respectively, and distributing the CDM over the LOI.

In an aspect, an apparatus is provided for RF channel switching in a multi-frequency network. The apparatus comprises messaging logic configured to identify a LOI in the multi-frequency network, and generate a CDM that associates at least one descrambling sequence identifier with each RF channel associated with the LOI, respectively. The apparatus also comprises output logic configured to distribute the CDM over the LOI.

In an aspect, an apparatus is provided for RF channel switching in a multi-frequency network. The apparatus comprises means for identifying a LOI in the multi-frequency network, means for generating a CDM that associates at least one descrambling sequence identifier with each RF channel associated with the LOI, respectively, and means for distributing the CDM over the LOI.

In an aspect, a computer program product is provided for RF channel switching in a multi-frequency network. The computer program product comprises a machine-readable medium comprising a first set of codes for causing a computer to identify a LOI in the multi-frequency network, and to generate a CDM that associates at least one descrambling sequence identifier with each RF channel associated with the LOI, respectively. The computer program product also comprises a second set of codes for causing the computer to distribute the CDM over the LOI.

In an aspect, at least one integrated circuit is provided that is configured to perform RF channel switching in a multi-frequency network. The at least one integrated circuit comprises a first module configured for identifying a LOI in the multi-frequency network, and for generating a CDM that associates at least one descrambling sequence identifier with each RF channel associated with the LOI, respectively. The at least one integrated circuit also comprises a second module configured for distributing the CDM over the LOI.

In an aspect, a method is provided for RF channel switching in a multi-frequency network. The method comprises receiving a CDM that associates at least one descrambling sequence identifier with each RF channel available in a LOI, detecting an RF channel switch event that identifies a selected RF channel, determining a selected descrambling sequence identifier from the CDM based on the selected RF channel, switching to the selected RF channel wherein the selected descrambling sequence identifier identifies a selected descrambling sequence to descramble desired content carried on the selected RF channel, and acquiring the desired content on the selected RF channel.

In an aspect, an apparatus is provided for RF channel switching in a multi-frequency network. The apparatus comprises input logic configured to receive a CDM that associates at least one descrambling sequence identifier with each RF channel available in a LOI, and processing logic configured to detect an RF channel switch event that identifies a selected RF channel. The apparatus also comprises messaging logic configured to determine a selected descrambling sequence identifier from the CDM based on the selected RF channel, and channel switch logic configured to switch to the selected RF channel wherein the selected descrambling sequence identifier identifies a selected descrambling sequence to descramble desired content carried on the selected RF channel and to acquire the desired content on the selected RF channel.

In an aspect, an apparatus is provided for RF channel switching in a multi-frequency network. The apparatus comprises means for receiving a CDM that associates at least one descrambling sequence identifier with each RF channel available in a LOI, and means for detecting an RF channel switch event that identifies a selected RF channel. The apparatus also comprises means for determining a selected descrambling sequence identifier from the CDM based on the selected RF channel, means for switching to the selected RF channel wherein the selected descrambling sequence identifier identifies a selected descrambling sequence to descramble desired content carried on the selected RF channel, and means for acquiring the desired content on the selected RF channel.

In an aspect, a computer program product is provided for channel switching in a multi-frequency network. The computer program product comprises a machine-readable medium that comprises a first set of codes for causing a computer to receive a CDM that associates at least one descrambling sequence identifier with each RF channel available in a LOI, and a second set of codes for causing the computer to detect an RF channel switch event that identifies a selected RF channel. The machine-readable medium also comprises a third set of codes for causing the computer to determine a selected descrambling sequence identifier from the CDM based on the selected RF channel, a fourth set of codes for causing the computer to switch to the selected RF channel wherein the selected descrambling sequence identifier identifies a selected descrambling sequence to descramble desired content carried on the selected RF channel, and a fifth set of codes for causing the computer to acquire the desired content on the selected RF channel.

In an aspect, at least one integrated circuit is provided that is configured to perform a method for RF channel switching in a multi-frequency network. The at least one integrated circuit comprises a first module configured to receive a CDM that associates at least one descrambling sequence identifier with each RF channel available in a LOI, and a second module configured to detect an RF channel switch event that identifies a selected RF channel. The at least one integrated circuit also comprises a third module configured to determine a selected descrambling sequence identifier from the CDM based on the selected RF channel, a fourth module configured to switch to the selected RF channel wherein the selected descrambling sequence identifier identifies a selected descrambling sequence to descramble desired content carried on the selected RF channel, and a fifth module configured to acquire the desired content on the selected RF channel.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

In one or more aspects, a switching system is provided that operates to provide fast and efficient RF channel switching in a multi-frequency network while reducing or eliminating spurious RF channel switches. In an aspect, the switching system aggregates descrambling sequence identifiers associated with RF channels in a particular LOI into a channel description message. The system generates a CDM for each LOI in the multi-frequency network. The CDMs are then transmitted to devices in the respective LOIs. A device receiving a CDM can use the descrambling sequence identifiers to determine the descrambling sequences associated with RF channels used in its current LOI. During an RF channel switch, the device utilizes the descrambling sequences to decode desired content within its current LOI on the selected RF channel. The system is well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

DEFINITIONS

The following definitions are used herein to describe aspects of a switching system.

1. Local Area—Refers to a local geographic area such as a building, group of buildings, community, city, county or other local region in which services may be broadcast.
2. Wide Area—Refers to a wide geographic area such as a county, state, multiple states, country, multiple countries or other wide region in which services may be broadcast.
3. Multiplex—Refers to a grouping of content flows.
4. Wide Area Multiplex—Refers to a grouping of content flows that are broadcasted over at least one wide area.
5. Local Area Multiplex—Refers to grouping of content flows that are broadcasted over at least one local area.
6. Wide Area Operations Infrastructure (WOI)—Refers to a grouping of transmitters and associated systems that operate to transmit content flows over a wide area. A WOI maps to the smallest geographical wide area which can carry a wide area multiplex. A wide area multiplex may be broadcasted over one or more WOIs.
7. Local Area Operations Infrastructure (LOI)—Refers to a grouping of transmitters and associated systems that operate to transmit content flows over a local area. A LOI maps to the smallest geographical local area which can carry a local area multiplex. A local area multiplex may be broadcasted over one or more LOIs.
8. RF Channel—Refers to a frequency that is used to convey a content distribution waveform over a selected LOI.
9. Content Channel—Refers to selected content flows within a particular distribution waveform. For example, a distribution waveform may comprise multiple content channels and each content channel may comprise one or more content flows.

Acronyms

Figure 1:
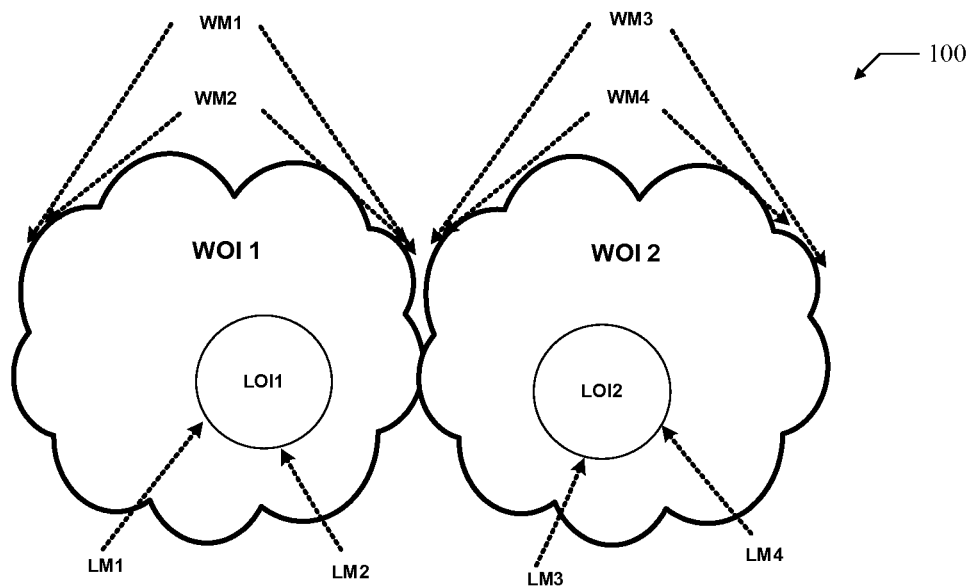
FIG. 1 shows a network diagram that illustrates the distribution of content over two wide area regions.

The following acronyms are used herein to describe aspects of a switching system.
LM—Local Area Multiplex
WM—Wide Area Multiplex
NOC—Network Operations Center
LOC—Local Operations Center
LOI—Local Operations Infrastructure
WOI—Wide Operations Infrastructure
WID—Wide Area Descrambling Identifier
LID—Local Area Descrambling Identifier
CDM—Channel Description Message Introduction FIG. 1 shows a network 100 that illustrates the distribution of content flows over two wide area regions. For example, a first wide area multiplex (WM1) and a second wide area multiplex (WM2) are distributed over WOI1. A third wide area multiplex (WM3) and a fourth wide area multiplex (WM4) are distributed over the WOI2. The WOI1 comprises LOI1 and the WOI2 comprises LOI2. A first local area multiplex (LM1) and a second local area multiplex (LM2) are distributed over the LOI1. Also, a third local area multiplex (LM3) and a fourth local area multiplex (LM4) are distributed over LOI2. It will be assumed that each LOI shown in FIG. 1 utilizes at least two RF channel to broadcast the described multiplexes over each associated local region. It should be noted that each WOI (WOI1 and WOI2) is shown to comprise only one LOI in FIG. 1 for simplicity; however, in a real world deployment a WOI can comprise multiple LOIs.

Figure 2:
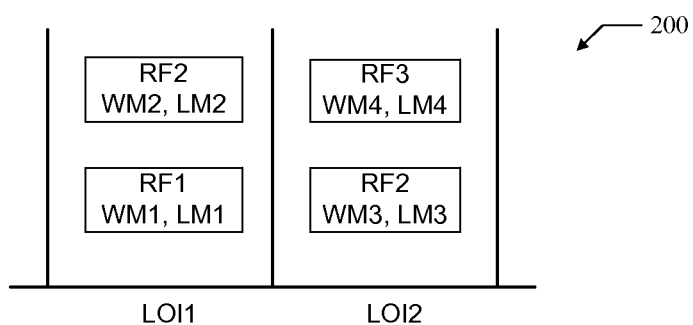
FIG. 2 shows a diagram that illustrates the allocation of RF channels utilized by two local area operations infrastructures (LOIs) illustrated in FIG. 1.

FIG. 2 shows a diagram 200 that illustrates the allocation of RF channels utilized by two LOIs illustrated in FIG. 1. For example, the RF channels utilized by LOI1 and LOI2 are shown in the diagram 200. The LOI1 utilizes a first RF channel (RF1) and a second RF channel (RF2). The LOI2 utilizes the second RF channel (RF2) and a third RF channel (RF3).

Each of the RF channels carries one or more multiplexes that are used to convey selected wide and local content and/or services. For example, it will be assumed for this description that in LOI1 the channel RF1 conveys WM1 and LM1, and the channel RF2 conveys WM2 and LM2. In LOI2 the channel RF2 conveys WM3 and LM3, and the channel RF3 conveys WM4 and LM4.

RF Channel Switching

During operation of a multi-frequency network, a device may attempt to switch between RF channels in its current LOI to access content on the other RF channels. Each RF channel carries a scrambled distribution waveform that comprises a wide area identification channel (WIC) and a local area identification channel (LIC). The WIC identification channel is further associated with a wide area descrambling sequence identifier (WID) and the LIC identification channel is further associated with a local area descrambling sequence identifier (LID). The WID and LID identify descrambling sequences that can be used to descramble the wide and local content carried in the distribution waveform. In general, a device attempts to decode a received distribution waveform using WID/LID descrambling sequences associated with the highest received WIC/LIC channel energy.

Spurious RF channel switches may occur when a device attempts to switch between RF channels in a particular LOI. For example, a device tuned to receive a content flow over channel RF1 in LOI1 may attempt to switch to channel RF2 in LOI1 to receive a different content flow. However, because of the device's location and/or transmission conditions, channel RF2 transmitted from LOI2 may be received at the device with higher WIC/LIC energy than channel RF2 transmitted in LOI1. Thus, a spurious RF channel switch may occur where the device utilizes WID/LID descrambling sequences associated with channel RF2 transmitted over LOI2 instead of the WID/LID descrambling sequences associated with channel RF2 transmitted over LOI1. The device then attempts to find the desired content in the distribution waveform received on channel RF2 of LOI2. Unfortunately, because the device is utilizing the incorrect WID/LID descrambling sequences the desired content will not be found. In various aspects, the switching system operates to provide correct WID/LID descrambling sequence identifiers to allow the device to perform an accurate RF channel switch to obtain the desired content.

Figure 3:
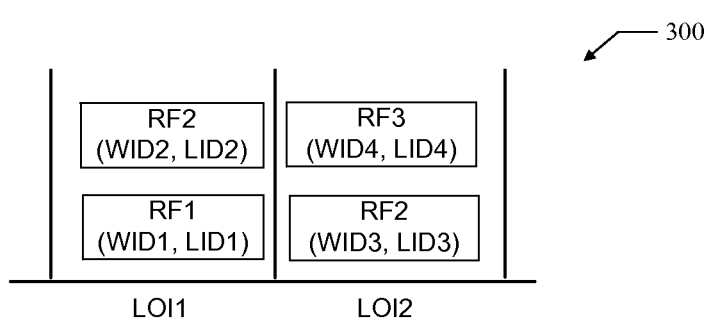
FIG. 3 shows a diagram that illustrates how WID/LID descrambling identifiers are provisioned in selected LOIs for use in aspects of a switching system.

FIG. 3 shows a diagram 300 that illustrates how WID/LID descrambling identifiers are provisioned in the network 100 for use in aspects of a switching system. For example, the diagram 300 illustrates how WID/LID identifiers associated with descrambling sequences used to descramble the wide multiplexes (WM1, WM2, WM3 and WM4) and the local multiplexes (LM1, LM2, LM3 and LM4) are provisioned for LOI1 and LOI2 in the network 100 shown in FIG. 1.

In the LOI1 and LOI2 there are two RF channels that carry wide and local area multiplexes. For example, in the LOI1, the channel RF1 carries the multiplexes WM1 and LM1 as illustrated in FIG. 2, and these multiplexes can be descrambled using descrambling sequences identified by WID1 and LID1, respectively, as illustrated in FIG. 3. Additionally, in the LOI1, the channel RF2 carries the multiplexes WM2 and LM2 as illustrated in FIG. 2, and these multiplexes can be descrambled using descrambling sequences identified by WID2 and LID2, respectively, as illustrated in FIG. 3. In the LOI2, the channels RF2 and RF3 carry wide area multiplexes (WM3 and WM4) and local area multiplexes (LM3 and LM4) as illustrated in FIG. 2, and these multiplexes can be descrambled using descrambling sequences identified by WID3, WID4, LID3, and LID4, respectively, as illustrated in FIG. 3.

In an aspect, the switching system operates to provide each LOI with a CDM that comprises a list of WID/LID identifiers that are associated with RF channels used in the LOI. The WID/LID identifiers identify wide-area/local-area descrambling sequences for each RF channel used in a particular LOI.

In an aspect, transmitter sites at each LOI transmit the associated CDM to devices operating in each LOI using a control channel (CC). Thus, a device operating within a particular LOI that wishes to switch RF channels can utilize the WID/LID descrambling identifiers provided in a received CDM to determine the correct descrambling sequences associated with the desired RF channel. For example, the WID/LID identifiers identify descrambling sequences that can be used to descramble the desired content from the correct distribution waveform.

Figure 4:
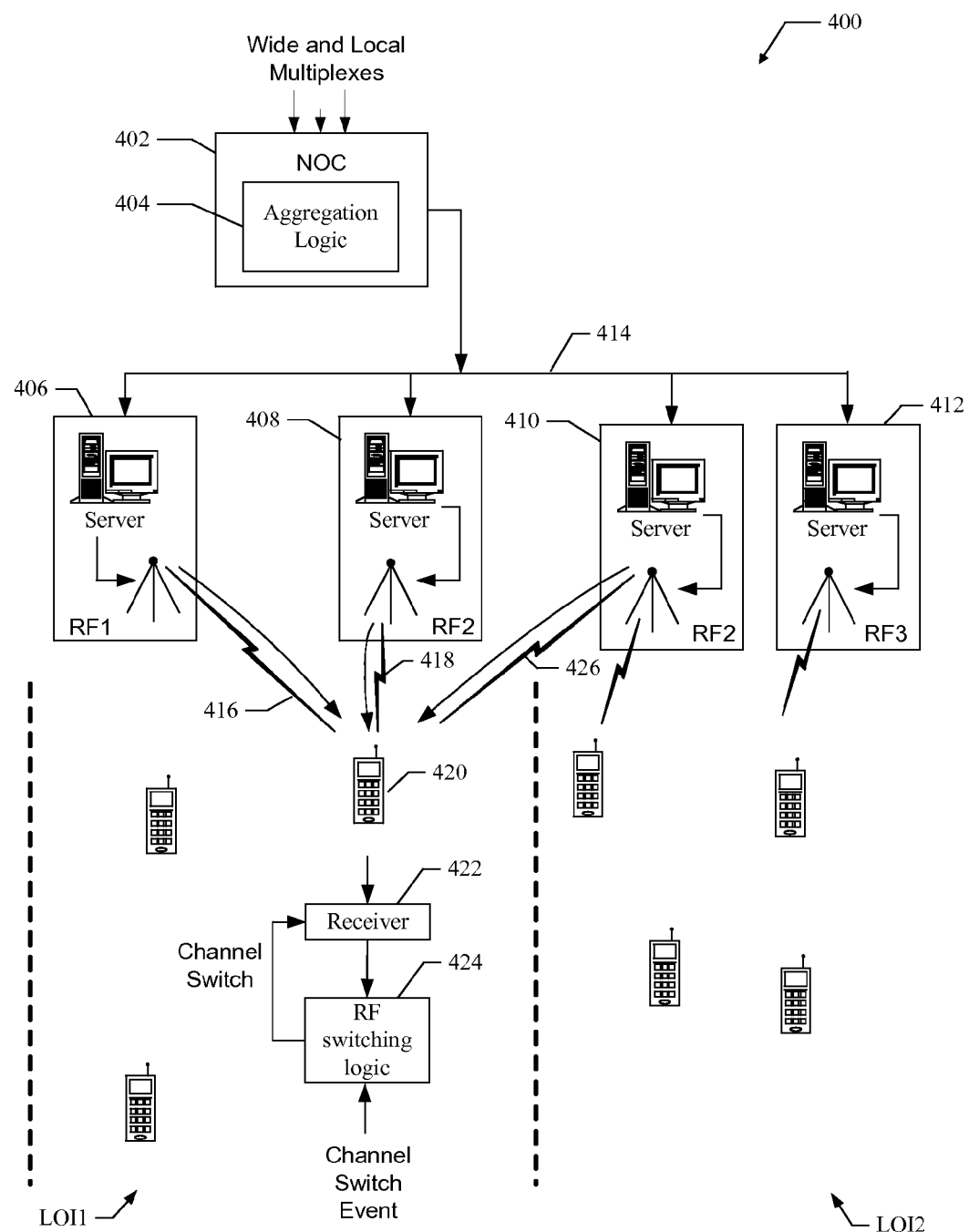
FIG. 4 shows a network that comprises an aspect of a switching system.

FIG. 4 shows a network 400 that comprises aspects of a switching system. For example, the network 400 is part of the network 100 shown in FIG. 1. The network 400 comprises a network operations center (NOC) 402, and the LOI1 and LOI2 as shown in FIG. 1.

The NOC 402 operates to receive wide and local content multiplexes for distribution over selected wide and local areas of a multi-frequency network. The NOC 402 also operates to configure the multi-frequency network to distribute that content. To accomplish this, the NOC 402 is aware of the geographic regions of the network, the RF channels used in each region, and any other network information that may be needed to configure the network and distribute the wide and local content multiplexes.

In an aspect, the NOC 402 comprises aggregation logic 404. The aggregation logic 404 operates to aggregate information relating to WID/LID descrambling identifiers that are associated with the RF channels in each LOI. For example, the wide and local content multiplexes are scrambled with wide area and local area scrambling sequences before transmission over the network 400. A CDM message is configured to provide a list of WID/LID identifiers associated with RF channels in a particular LOI. A more detailed description of the CDM messages generated by the aggregation logic 404 is provided in another section of this document.

The NOC 402 operates to transmit the wide and local multiplexes and the generated CDMs to the LOIs in the network 400. It should be noted that although only two LOIs are shown, the NOC 402 may transmit the multiplexes and associated CDMs to any number of LOIs.

In an aspect, the LOI1 and LOI2 comprise one or more transmitter sites. For example, the LOI1 comprises transmitter sites 406 and 408 and the LOI2 comprises transmitter sites 410 and 412. Each transmitter site operates to transmit information on a selected RF channel over its respective LOI. For example, the transmitter site 408 transmits information over LOI1 using the RF channel RF2. It should also be noted that the transmitter sites in each LOI may or may not be co-located.

In an aspect, the NOC 402 operates to transmit the content multiplexes and the CDMs to the transmitter sites using any suitable transport mechanism, as illustrated at 414. For example, in an aspect, the NOC 402 transmits the content multiplexes and the CDM messages to the transmitter sites using an MPEG-2 transport mechanism. In this configuration, the multiplexes and CDM messages are assigned MPEG-2 transport identifiers so that each transmitter site can detect and receive selected multiplexes and a CDM message that are meant to be transmitted over a LOI associated with each transmitter site.

In an aspect, servers at the transmitter sites use the transport identifiers to determine which multiplexes and CDM messages are intended for them to transmit over their respective LOIs. The servers then operate to pack their respective multiplexes and a CDM message into transmission frames for transmission over a selected RF channel. The servers utilize any suitable physical layer process to pack the multiplexes and the CDM message into the transmission frames for transmission. By using the transport identifiers to determine the multiplexes and the CDM message intended for transmission over their respective LOIs, the servers at the transmitter sites need not decode any of the multiplexes or the CDM message. The servers only need to detect the appropriate transport identifiers and then pack the received multiplexes and the CDM message into the transmission frames according to the physical layer process.

The transmission frames comprise content flows associated with the wide and local multiplexes and the CDM message generated by the aggregation logic 404. In an aspect, the transmission frames comprise wide and local partitions that are used to convey the wide and local content flows, respectively. In addition, the wide and local partitions comprise wide and local control channels. In an aspect, the local control channel is used to convey the CDM message generated by the aggregation logic 404 to the devices in each LOI.

In an aspect, the transmitter site 406 operates to transmit its transmission frames over the LOI1 using the RF channel (RF1) as shown at 416, and the transmitter site 408 operates to transmit its transmission frames over the LOI1 using the RF channel (RF2) as shown at 418. By using multiple RF channels, the network 100 is able to transmit more content flows over each LOI. It should be noted that the transmitter sites 406 and 408 may be co-located in the LOI1 or separated by any desired distance.

In a similar fashion, the transmitter sites 410 and 412 operate to receive content multiplexes and CDM messages from the NOC 402 for transmission to devices in the LOI2. The CDM message received by the transmitter sites 410 and 412 may be different from the CDM message received by the transmitter sites 406 and 408. The CDM messages may be different because the LOI1 and the LOI2 utilize different set of RF channels and associated descrambling sequence identifiers.

In an aspect, a device 420 comprises a receiver 422 that operates to tune to a selected RF channel in the LOI1 to receive selected transmission frames. For example, the receiver 422 operates to tune to the RF channel (RF1) 416 to receive the transmission frames from the transmitter site 406. The transmission frames that are received comprise a local control channel that conveys a CDM message generated by the aggregation logic 404. The CDM message comprises a list of WID/LID descrambling sequence identifiers that identify descrambling sequences that are used by the device 420 in the LOI1 to descramble content received in the transmission frames associated with RF channels in LOI1.

The receiver 422 passes the received WID/LID identifiers to RF switching logic 424. The RF switching logic 424 operates to receive RF channel switch events. The RF channel switch events are events that cause the device 420 to switch from one RF channel to another RF channel to receive one or more desired content flows. In an aspect, an RF channel switch event may be triggered in response to a device user request or a request generated by a program executing at the device 420.

In an aspect, the NOC 402 operates to inform devices in each LOI about the RF channel location of all content flows within each LOI. For example, any suitable technique may be used to inform devices about the RF channel location of content flows within a particular LOI (e.g., by sending a control channel message to the device that contains an RF channel to content flow mapping). Once a device determines a particular RF channel that carries the desired content flow, the information received in the CDM is used by the device to determine WID/LID descrambling sequences needed to descramble content received over that particular RF channel.

When an RF channel switch event occurs, the RF switching logic 424 operates to determine the correct WID/LID descrambling sequences associated with the new RF channel from CDM. In doing so, the device 420 is able to switch to the new RF channel and successfully find the desired content. For example, the RF switching logic 424 outputs an RF channel switch message to the receiver 422 to implement the RF channel switch. The RF channel switch message contains the correct WID/LID identifiers so that the desired content can be decoded by the receiver 422. Without the correct WID/LID identifiers, the device 420 might perform a spurious RF channel switch in which the device tries to decode transmission frames using the wrong WID/LID descrambling sequences and therefore will be unable to find the desired content. For example, it will be assumed that the device 420 is currently tuned to receive channel RF1 (416) in LOI1 and wishes to switch to channel RF2 (418) in LOI1 to receive desired content. By using the WID/LID identifiers in the CDM the device is able to determine the correct descrambling sequences (WID2, LID2) to allow it to descramble the content on RF2 (418). Otherwise, if RF2 from LOI2 is received at the device 420 with higher energy than RF2 from LOI1, the device 420 may inadvertently switch to channel RF2 (426) transmitted from LOI2 in an attempt to find the desired content. In this case the desired content will not be found on channel RF2 (426) transmitted from LOI2.

Therefore, aspects of the switching system operate to allow a device to avoid spurious RF channel switches. It should be noted that the network 400 illustrates just one implementation of a switching system and that other implementations are possible within the scope of the various aspects.

Figure 5:
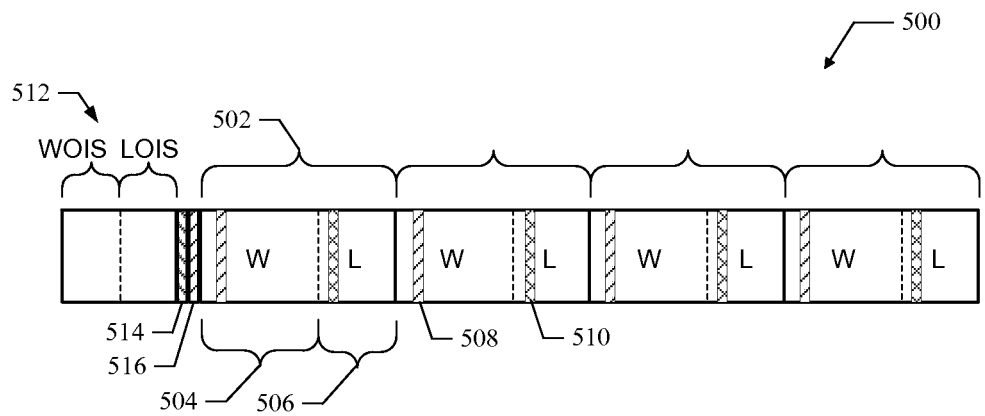
FIG. 5 shows a diagram of a transmission frame for use in aspects of a switching system.

FIG. 5 shows a diagram of a transmission frame 500 for use in aspects of a switching system. For example, the transmission frame 500 may be packed with wide and local content multiplexes and a CDM message, and transmitted by one or more of the transmitter sites shown in FIG. 4.

The transmission frame 500 comprises four sub-frames, shown generally at 502, that are used to convey wide and local content. For example, each sub-frame 502 comprises a wide area partition 504 that is packed with wide area content, and a local area partition 506 that is packed with local area content.

Included in the wide area partition 504 is a wide area control channel 508. The wide area control channel 508 operates to convey messages pertaining to wide area content multiplexes. Included in the local area partition 506 is a local area control channel 510. The local area control channel 510 operates to convey messages pertaining to local area content multiplexes. In an aspect, the local area control channel is used to convey the CDM message.

At the start of the transmission frame 500 are overhead information symbols (OIS) 512 that provide overhead information that is used to locate the wide area control channel, the local area control channel, and the wide and local content that is packed into the sub-frames 502. The OIS 512 comprises wide overhead information symbols (WOIS) and local overhead information symbols (LOIS). The transmission frame 500 also comprises one or more WIC symbols 514 and one or more LIC symbols 516. The WIC 514 and LIC 516 symbols are used to determine WIC/LIC energy.

Figure 6:
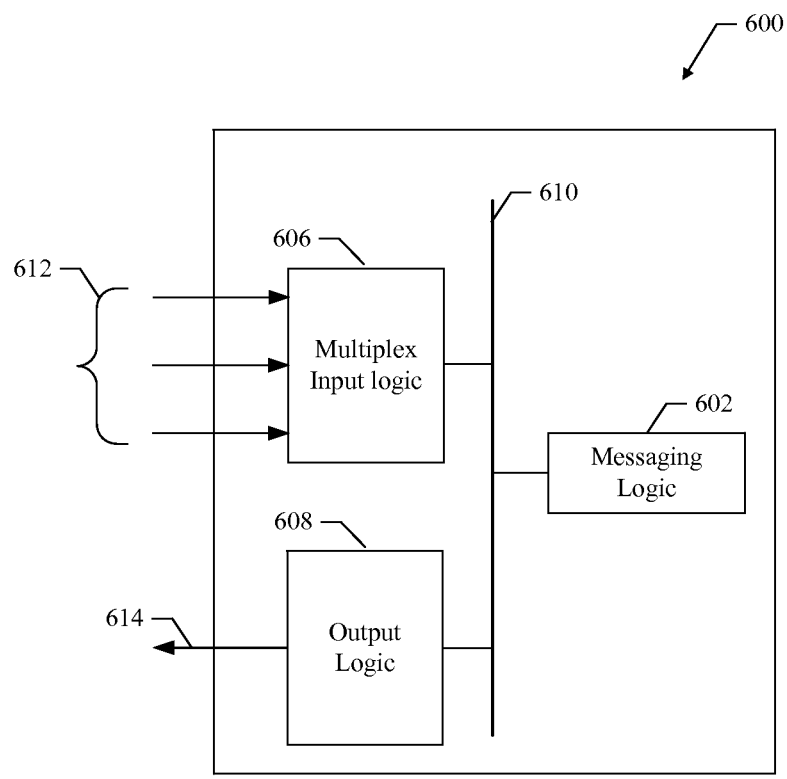
FIG. 6 shows aggregation logic for use in aspects of a switching system.

FIG. 6 shows aggregation logic 600 for use in aspect of a switching system. For example, the aggregation logic 600 is suitable for use as the aggregation logic 404 shown in FIG. 4. The aggregation logic 600 comprises messaging logic 602, multiplex input logic 606, and output logic 608 all coupled to a data bus 610.

The multiplex input logic 606 comprises at least one CPU, processor, gate array, hardware logic, memory elements, and/or hardware executing software. The multiplex input logic 606 operates to receive one or more wide and/or local area multiplexes 612 that are to be distributed over wide and local regions of a multi-frequency distribution network.

The messaging logic 602 comprises at least one CPU, processor, gate array, hardware logic, memory elements, and/or hardware executing software. The messaging logic 602 operates to generate messages for use in aspects of the switching system. In an aspect, the messaging logic 602 generates one or more CDM messages that associate WID/LID identifiers with RF channels used in particular LOIs. A more detailed description of the CDM is provided in another section of this document.

The output logic 608 comprises at least one CPU, processor, gate array, hardware logic, memory elements, and/or hardware executing software. The output logic 608 operates to output content multiplexes and CDM messages for distribution to LOIs in a multi-frequency network. For example, the output logic 608 operates to output content multiplexes and CDM messages to transmitter sites in a multi-frequency network using any type of transport mechanism.

In an aspect, the switching system comprises a computer program product comprising a machine-readable medium embodying one or more program instructions ("instructions") or sets of "codes", which when executed by at least one processor, for instance, a processor at the messaging logic 602, provides the functions described herein. For example, the sets of codes may be loaded into the aggregation logic 600 from a machine-readable medium, such as a floppy disk, CDROM, memory card, FLASH memory device, RAM, ROM, or any other type of memory device or machine-readable medium that interfaces to the aggregation logic 600. In another aspect, the sets of codes may be downloaded into the aggregation logic 600 from an external device or network resource. The sets of codes, when executed, provide aspects of a switching system as described herein.

Figure 7:
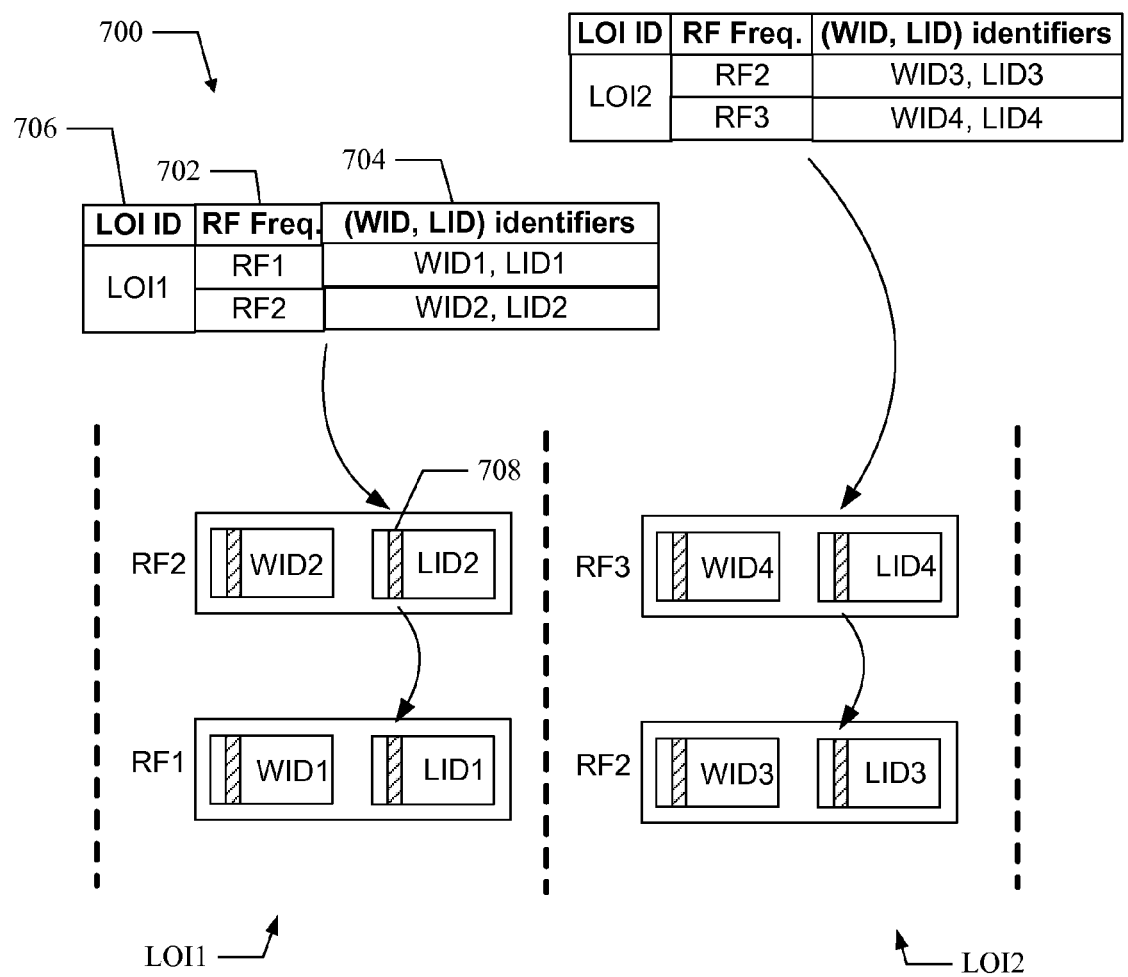
FIG. 7 shows a diagram that illustrates an RF channel description message for use in aspects of a switching system.

FIG. 7 shows a diagram that illustrates a channel description message 700 for use in aspects of a switching system. For example, the CDM 700 is generated by the messaging logic 602 shown in FIG. 6.

In an aspect, the CDM 700 is generated separately for each LOI and is configured to associate RF channels 702 with WID/LID descrambling identifiers 704 for a LOI 706 in a multi-frequency network. For example, the CDM 700 shows the RF channels associated with the LOI1. For each RF channel, WID/LID identifiers are provided. In an aspect, the CDM 700 is distributed over the LOI1 using the local control channel 708. It should be noted that another CDM message is generated for distribution over the LOI2, and that CDM comprises WID/LID identifiers for LOI2 as illustrated.

Figure 8:
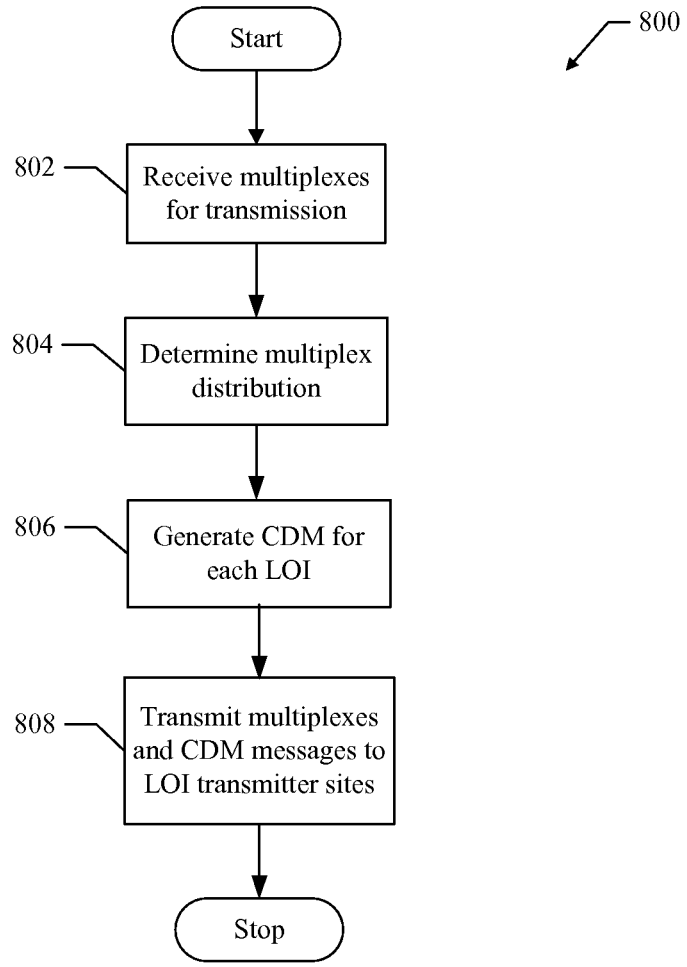
FIG. 8 shows a method for operating aggregation logic for use in aspects of a switching system.

FIG. 8 shows a method 800 for use in aspects of a switching system. For clarity, the method 800 is described herein with reference to the aggregation logic 600 shown in FIG. 6. For example, in an aspect, the messaging logic 602 executes one or more sets of codes to control the aggregation logic 600 to perform the functions described below.

At block 802, one or more wide and/or local multiplexes are received for distribution over a multi-frequency network. For example, the multiplexes are received at the NOC 402 shown in FIG. 4.

At block 804, the distribution of the received multiplexes is determined. For example, the NOC 402 determines the distribution of the wide area and local multiplexes to selected WOIs and LOIs. In an aspect, the NOC 402 determines which multiplexes are to be delivered to each LOI and the RF channels that are to be used to deliver the content flows of each multiplex within each LOI.

At block 806, CDM messages are generated for each LOI. For example, for each LOI in the distribution network, a CDM is generated that associates RF channels with WID/LID identifiers for that particular LOI. For example, the messaging logic 602 operates to generate the CDM messages, which may be formatted as the CDM 700 illustrated in FIG. 7.

At block 808, the multiplexes and CDM messages are transmitted to transmitter sites for distribution to devices in each LOI. For example, the multiplexes and CDM messages are transmitted to the LOIs using any suitable transport mechanism. From the transmitter sites the CDM messages are distributed over each LOI using local control channels in the transmission frames as illustrated in FIG. 5.

Thus, the method 800 operates to provide an aspect of a switching system. It should be noted that the method 800 represents just one implementation and that other implementations are possible within the scope of the aspects.

Figure 9:
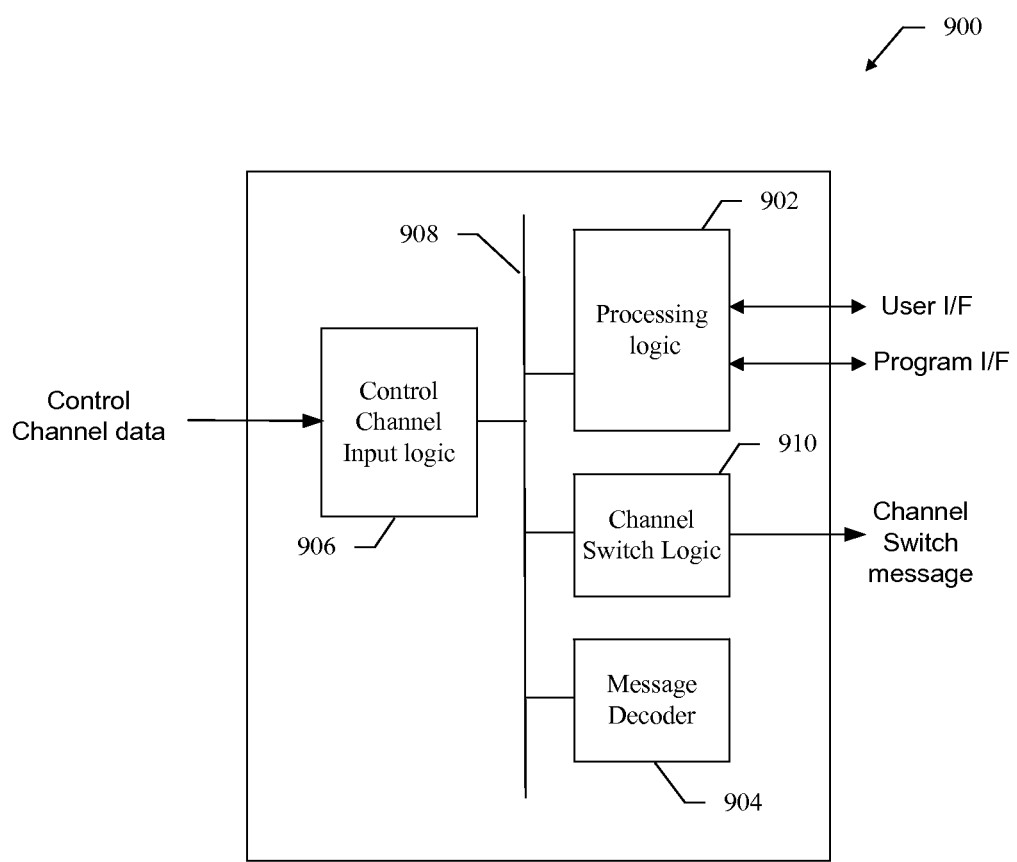
FIG. 9 shows RF switching logic for use in aspects of a switching system.

FIG. 9 shows RF switching logic 900 for use in aspects of a switching system. For example, the RF switching logic 900 is suitable for use as the RF switching logic 424 shown in FIG. 4. The RF switching logic 900 comprises processing logic 902, message decoder 904, channel switch logic 910, and control channel input logic 906 all coupled to a data bus 908.

The control channel input logic 906 comprises at least one of a CPU, processor, gate array, hardware logic, memory elements, and/or hardware executing software. The control channel input logic 906 operates to receive local control channel data over the RF channel the device is currently tuned to and passes this data to the message decoder 904. For example, a CDM message is received over a local control channel that is part of a transmission frame as illustrated in FIG. 5. In an aspect, the control channel input logic 906 also receives a mapping of content flows to RF channels over the control channel and passes this mapping to the processing logic 902.

The message decoder 904 comprises at least one of a CPU, processor, gate array, hardware logic, memory elements, and/ or hardware executing software. In an aspect, the message decoder 904 operates to decode a CDM message received over the local control channel. For example, the CDM message is formatted as illustrated in FIG. 7 and is decoded to determine the WID/LID descrambling identifiers associates with RF channels in the current LOI. The CDM information is passed to the processing logic 902.

The processing logic 902 comprises at least one of a CPU, processor, gate array, hardware logic, memory elements, and/ or hardware executing software. In an aspect, the processing logic 902 operates to interface with a device user, an executing application program, or other logic from which an RF channel switch event is received. For example, a device user may request an RF channel switch to view a particular content flow carried on another RF channel. Because the processing logic 902 knows the RF channel locations of all content flows in the LOI (provided by the mapping described above), the processing logic 902 sends an identifier of the desired RF channel and the WID/LID descrambling sequence identifiers associated with the desired RF channel obtained from the received CDM to the channel switch logic 910.

The channel switch logic 910 comprises at least one of a CPU, processor, gate array, hardware logic, memory elements, and/or hardware executing software. In an aspect, the channel switch logic 910 operates to generate a channel switch message that comprises the desired RF channel and the WID/LID descrambling sequence identifiers to the device receiver 422. With this information, the receiver 422 can quickly switch to the correct RF channel and use the correct WID/LID descrambling sequence identifiers to receive the desired content flow. Thus, spurious channel switches are avoided which provides for fast content channel switching and enhanced user experience.

In an aspect, the switching system comprises a computer program product comprising a machine-readable medium embodying one or more program instructions ("instructions") or sets of "codes", which when executed by at least one processor, for instance, a processor at the processing logic 902, cause a computer to provide the functions described herein. For example, the sets of codes may be loaded into the RF switch logic 900 from a machine-readable medium, such as a floppy disk, CDROM, memory card, FLASH memory device, RAM, ROM, or any other type of memory device or machine-readable medium that interfaces to the RF switch logic 900. In another aspect, the sets of codes may be downloaded into the RF switch logic 900 from an external device or network resource. The sets of codes, when executed, cause a computer to provide aspects of a switching system as described herein.

Figure 10:
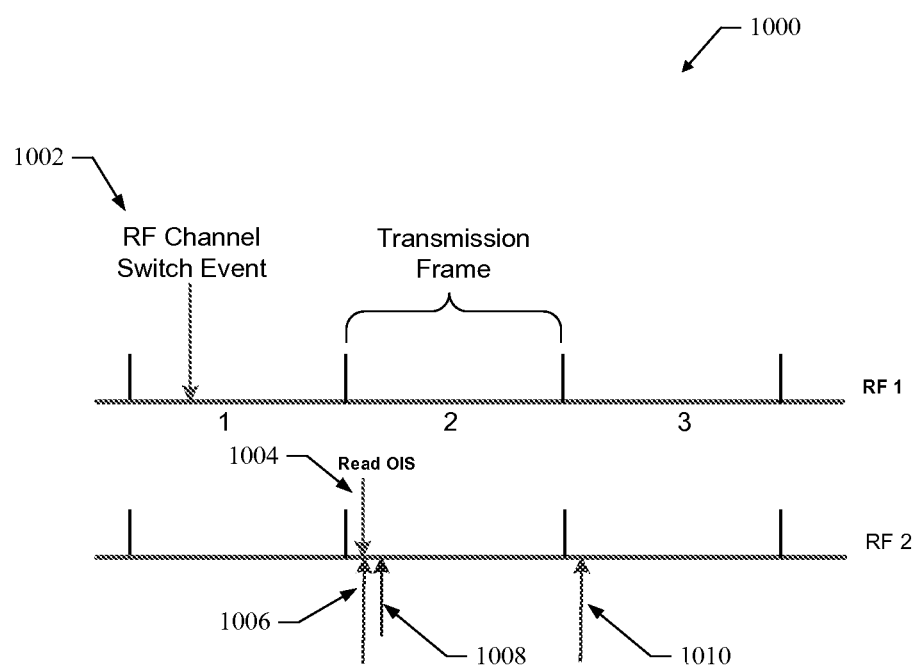
FIG. 10 shows a timeline that illustrate the operation of aspects of a switching system.

FIG. 10 shows a timeline 1000 that illustrate the operation of aspects of a switching system. The timeline 1000 shows a sequence of three transmission frames (1, 2, and 3) that are transmitted on RF channels RF1 and RF2 in LOI1. It will be assumed that a device is currently tuned to receive the channel RF1. An RF channel switch event 1002 is detected at the device during transmission frame 1. For example, the RF channel switch event occurs when the device user attempts to retune the device to receive/decode a selected content flow. In an aspect, the RF channel switch event is detected by the processing logic 902.

The processing logic 902 operates to determine the RF channel of the desired content flow from stored information. For example, a mapping of RF channels and associated content flows is stored at the device. Once the RF channel of the desired content flow is determined, the associated WID/LID values are determined based on the WID/LID values associated with that RF channel in the current LOI that are provided in a previously received CDM. Assuming the desired content flow is on RF channel RF2, the device then performs an RF channel switch to receive transmission frames on RF2.

At the start of the next transmission frame (2), the device reads the OIS at 1004. The OIS includes sequence numbers which indicate the latest state of the control channel. If the control channel sequence numbers on the OIS have not been updated since it was last read, the device begins decoding and rendering the desired content at 1008. If the sequence numbers of the control channel have been updated since it was last read, the device reads the new control channel information in transmission frame 2 at 1006 and begins decoding and rendering the desired content in the next transmission frame (3) as shown at 1010. Thus, the system operates to provide a fast RF channel switch since the desired content is decoded and rendered on the very next transmission frame after the channel switch event occurs when the control channel information has not changed. It should be noted that control channel information typically does not change very frequently, and so the channel switch mostly occurs in the next transmission frame after an RF channel switch event is detected.

Figure 11:
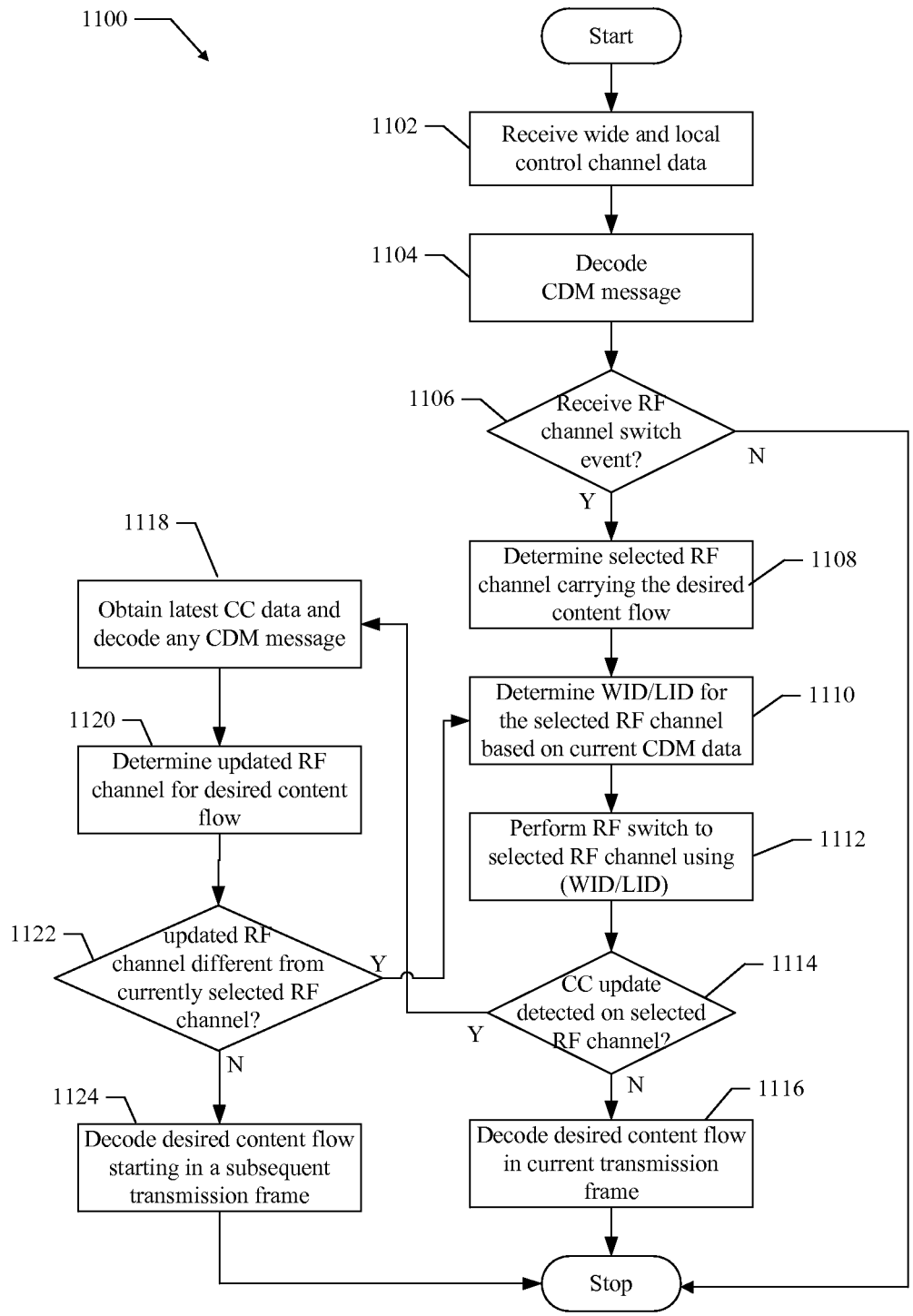
FIG. 11 shows a method for operating RF switching logic for use in aspects of a switching system.

FIG. 11 shows a method 1100 for use in aspects of a switching system. For clarity, the method 1100 is described herein with reference to the RF switch logic 900 shown in FIG. 9. For example, in an aspect, the processing logic 902 executes one or more sets of codes to control the RF switching logic 900 to perform the functions described below.

At block 1102, wide and local control channel data is received. In an aspect, the wide and local control channel data is received by the control channel input logic 906. For example, wide and local control channel data is received at a device in a sequence of transmission frames that are formatted as illustrated in FIG. 5.

At block 1104, a CDM message received in the local control channel is decoded. In an aspect, the CDM message is formatted as illustrated in FIG. 7. The CDM message associates RF channels with WID/LID descrambling sequence identifiers for RF channels in a given LOI. In an aspect, the information in the CDM message is stored at the device.

At block 1106, a determination is made as to whether an RF channel switch event has been received. For example, an RF channel switch event may be triggered by a device user or from an executing program. In an aspect, the RF channel switch event is a request to decode a desired content flow carried on a different RF channel within the current LOI. In an aspect, the processing logic 902 operates to determine if an RF channel switch event has been received. If an RF channel switch event has been received, the method proceeds to block 1108. If a channel switch event has not been received, the method exits.

At block 1108, a selected RF channel carrying the desired content flow is determined. In an aspect, the processing logic 902 operates to determine the selected RF channel carrying the desired content based on previously stored mapping information. For example, a message describing a mapping between RF channels and content flows is received over a control channel and is stored at the device.

At block 1110, WID/LID identifiers are determined for the selected RF channel carrying the desired content flow based on the information in the stored CDM message. In an aspect, the processing logic 902 operates to determine WID/LID descrambling sequence identifiers to be used to descramble content on the selected RF channel. For example, the CDM is formatted as illustrated in FIG. 7 and provides a mapping between RF channels and WID/LID identifiers in the current LOI. The processing logic 902 operates to determine the WID/LID identifier associated with the selected RF channel from this mapping.

At block 1112, a switch to the selected RF channel is performed. In an aspect, the channel switch logic 910 operates to generate an RF channel switch message that identifies the selected RF channel and sends this message to receiving logic at the device. The RF channel switch message includes the determined WID/LID descrambling sequence identifiers associated with the selected RF channel. The receiver then tunes to the selected RF channel and uses the WID/LID identifiers to determine the correct descrambling sequences with which to descramble received transmission frames on the selected RF channel.

At block 1114, a determination is made as to whether the control channel information carried on the selected RF channel has changed. For example, the control channel information on all RF channels in a given LOI is identical and comprises a control channel sequence identifier that can be used to determine when the control channel information has changed. In an aspect, the processing logic 902 obtains the control channel sequence numbers from the OIS and determines if the control channel information has changed since it was last stored at the device. If the control channel information has not changed, the method proceeds to block 1116. If the control channel information has changed, the method proceeds to block 1118.

At block 1116, the desired content flow is decoded in the current transmission frame. For example, the receiver 422 begins decoding the desired content using the identified WID/LID descrambling sequences.

At block 1118, new control channel data is obtained on the selected RF channel in the current transmission frame. For example, the control channel input logic 906 operates to obtain new control channel information on the selected RF channel. The message decoder 904 operates to decode any new CDM message to determine new mappings between RF channels and WID/LID identifiers or other control channel messages to determine updated content flow to RF channel mappings. The information is then stored at the device.

At block 1120, an updated RF channel carrying the desired content flow is determined. In an aspect, the processing logic 902 operates to determine the updated RF channel carrying the desired content based on the updated mapping information received from the control channel. It should be noted that the updated RF channel may be the same as the currently selected RF channel. For example, a message describing a mapping between RF channels and content flows is received over the control channel and is stored at the device.

At block 1122, a determination is made as to whether the updated RF channel that carries the desired content flow is different from the currently selected RF channel. If the updated RF channel that carries the desired content flow is different from the currently selected RF channel, then the updated RF channel is designated as the currently selected RF channel and the method proceeds to block 1110. If the updated RF channel is not different from the currently selected RF channel, then the method proceeds to block 1124.

At block 1124, the desired content is decoded and rendered starting with the next transmission frame. For example, the receiver 422 begins decoding the desired content in the next transmission frame using the identified WID/LID descrambling sequences.

Thus, the method 1100 operates to provide an aspect of a switching system. It should be noted that the method 1100 represents just one implementation and that other implementations are possible within the scope of the aspects.

Figure 12:
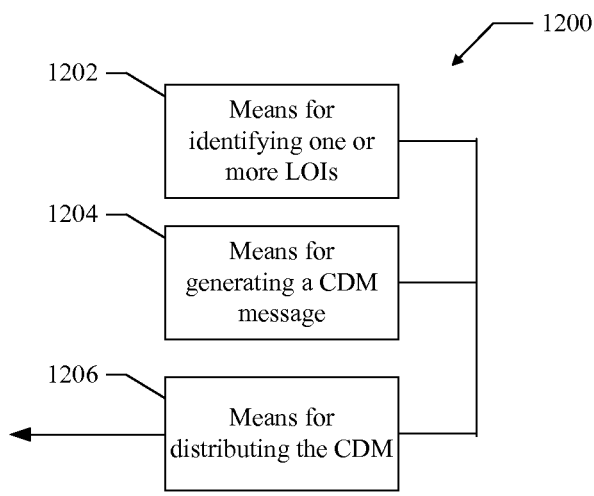
FIG. 12 shows aggregation logic for use in aspects of a switching system.

FIG. 12 shows aggregation logic 1200 for use in aspects of a switching system. For example, the aggregation logic 1200 is suitable for use as the aggregation logic 600 shown in FIG. 6. In an aspect, the aggregation logic 1200 is implemented by at least one integrated circuit comprising one or more modules configured to provide aspects of a switching system as described herein.

The aggregation logic 1200 comprises a first module comprising means (1202) for identifying a local area operations infrastructure (LOI) in the multi-frequency network, which in an aspect comprises the messaging logic 602. The aggregation logic 1200 also comprises a second module comprising means (1204) for generating a channel description message (CDM) that associates at least one descrambling sequence identifier with each radio frequency (RF) channel associated with the LOI, respectively, which in an aspect comprises the messaging logic 602. The aggregation logic 1200 also comprises a third module comprising means (1206) for distributing the CDM over the LOI, which in an aspect comprises the output logic 608.

Figure 13:
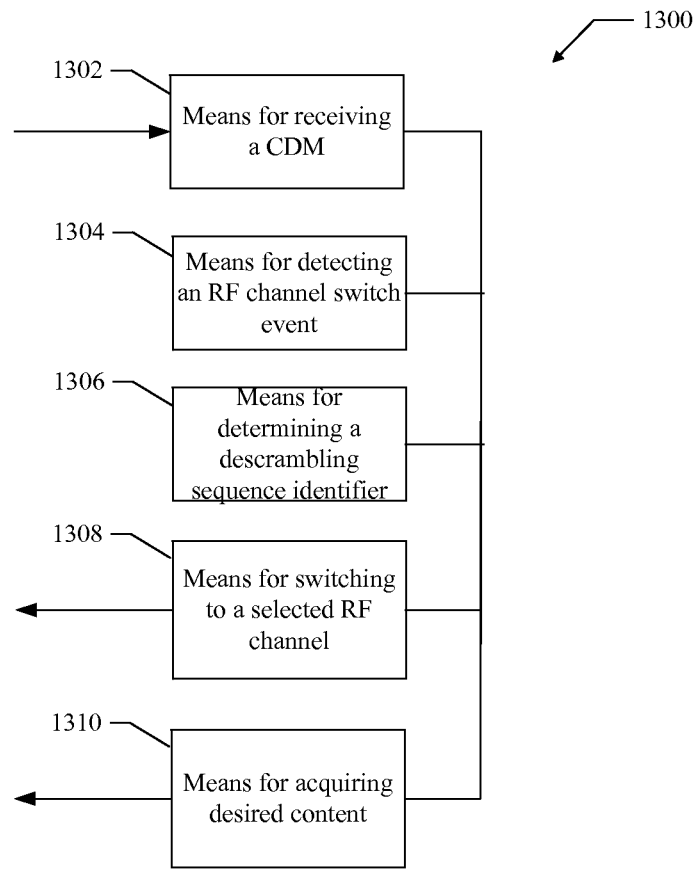
FIG. 13 shows RF switching logic for use in aspects of a switching system.

FIG. 13 shows RF switching logic 1300 for use in aspects of a switching system. For example, the RF switching logic 1300 is suitable for use as the RF switching logic 900 shown in FIG. 9. In an aspect, the RF switching logic 1300 is implemented by at least one integrated circuit comprising one or more modules configured to provide aspects of a switching system as described herein.

The RF switching logic 1300 comprises a first module comprising means (1302) for receiving a channel description message (CDM) that associates at least one descrambling sequence identifier with each radio frequency (RF) channel available in a local operations infrastructure (LOI), which in an aspect comprises the control channel input logic 906. The RF switching logic 1300 also comprises a second module comprising means (1304) for detecting a channel switch event that identifies a selected RF channel, which in an aspect comprises the processing logic 902. The RF switching logic 1300 also comprises a third module comprising means (1306) for determining a selected descrambling sequence identifier from the CDM based on the selected RF channel, which in an aspect comprises the processing logic 902. The RF switching logic 1300 also comprises a fourth module comprising means (1308) for switching to the selected RF channel wherein the selected descrambling sequence identifier identifies a selected descrambling sequence to descramble desired content carried on the selected RF channel, which in an aspect comprises the channel switch logic 910. The RF switching logic 1300 also comprises a fifth module comprising means (1310) for acquiring the desired content on the selected RF channel, which in an aspect comprises the channel switch logic 910.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a switching system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for RF channel switching in a multi-frequency network, the method comprising:
    identifying a local area operations infrastructure (LOI) in the multi-frequency network;
    generating a channel description message (CDM) that associates at least one descrambling sequence identifier with each radio frequency (RF) channel associated with the LOI, respectively;
    distributing the CDM over the LOI; and
    providing an indication in overhead information transmitted over the LOI that indicates whether the CDM is different than a previously distributed CDM.

2. The method of claim 1, wherein said generating comprises:
    generating a plurality of CDM messages associated with a plurality of LOIs, respectively; and
    distributing the plurality of CDM messages over their associated LOIs.

3. The method of claim 1, wherein said generating comprises generating the CDM to comprise at least one of a wide area descrambling sequence identifier (WID) and a local area descrambling sequence identifier (LID).

4. An apparatus for RF channel switching in a multi-frequency network, the apparatus comprising:
    messaging logic configured to identify a local area operations infrastructure (LOI) in the multi-frequency network, and generate a channel description message (CDM) that associates at least one descrambling sequence identifier with each radio frequency (RF) channel associated with the LOI, respectively; and
    output logic configured to distribute the CDM over the LOI and provide an indication in overhead information transmitted over the LOI as to whether the CDM is different than a previously distributed CDM.

5. The apparatus of claim 4, wherein said messaging logic is configured to generate a plurality of CDM messages associated with a plurality of LOIs, respectively.

6. The apparatus of claim 5, wherein said output logic is configured to distribute the plurality of CDM messages over their associated LOIs.

7. The apparatus of claim 4, wherein said messaging logic is configured to generate the CDM to comprise at least one of a wide area descrambling sequence identifier (WID) and a local area descrambling sequence identifier (LID).

8. An apparatus for RF channel switching in a multi-frequency network, the apparatus comprising:
    means for identifying a local area operations infrastructure (LOI) in the multi-frequency network;

means for generating a channel description message (CDM) that associates at least one descrambling sequence identifier with each radio frequency (RF) channel associated with the LOI, respectively;

means for distributing the CDM over the LOI; and means for providing an indication in overhead information transmitted over the LOI that indicates whether the CDM is different than a previously distributed CDM.

9. The apparatus of claim 8, wherein said means for generating comprises:

means for generating a plurality of CDM messages associated with a plurality of LOIs, respectively; and means for distributing the plurality of CDM messages over their associated LOIs.

10. The apparatus of claim 8, wherein said means for generating comprises means for generating the CDM to comprise at least one of a wide area descrambling sequence identifier (WID) and a local area descrambling sequence identifier (LID).

11. A non-transitory computer readable medium embodied with a computer program product comprising computer executable codes for RF channel switching in a multi-frequency network, the computer program product comprising:

a first set of codes for causing a computer to identify a local area operations infrastructure (LOI) in the multi-frequency network, and to generate a channel description message (CDM) that associates at least one descrambling sequence identifier with each radio frequency (RF) channel associated with the LOI, respectively;

a second set of codes for causing the computer to distribute the CDM over the LOI; and a third set of codes for causing the computer to provide an indication in overhead information transmitted over the LOI that indicates whether the CDM is different than a previously distributed CDM.

12. The non-transitory computer readable medium of claim 11, wherein said first set of codes are configured to cause the computer to generate a plurality of CDM messages associated with a plurality of LOIs, respectively.

13. The non-transitory computer readable medium of claim 12, wherein said second set of codes are configured to cause the computer to distribute the plurality of CDM messages over their associated LOIs.

14. The non-transitory computer readable medium of claim 11, wherein said first set of codes are configured to generate the CDM to comprise at least one of a wide area descrambling sequence identifier (WID) and a local area descrambling sequence identifier (LID).

15. At least one integrated circuit configured to perform RF channel switching in a multi-frequency network, the at least one integrated circuit comprising:

a first module configured for identifying a local operations infrastructure (LOI) in the multi-frequency network, and for generating a channel description message (CDM) that associates at least one descrambling sequence identifier with each radio frequency (RF) channel associated with the LOI, respectively;

a second module configured for distributing the CDM over the LOI; and a third module configured for providing an indication in overhead information transmitted over the LOI that indicates whether the CDM is different than a previously distributed CDM.

16. The at least one integrated circuit of claim 15, wherein said first module is configured for generating a plurality of CDM messages associated with a plurality of LOIs, respectively.

17. The at least one integrated circuit of claim 16, wherein said second module is configured for distributing the plurality of CDM messages over their associated LOIs.

18. The at least one integrated circuit of claim 15, wherein said first module is configured for generating the CDM to comprise at least one of a wide area descrambling sequence identifier (WID) and a local area descrambling sequence identifier (LID).

19. A method for RF channel switching in a multi-frequency network, the method comprising:

receiving a channel description message (CDM) that associates at least one descrambling sequence identifier with each radio frequency (RF) channel available in a local area operations infrastructure (LOI);

detecting an RF channel switch event that identifies a selected RF channel;

determining a selected descrambling sequence identifier from the CDM based on the selected RF channel;

switching to the selected RF channel wherein the selected descrambling sequence identifier identifies a selected descrambling sequence to descramble desired content carried on the selected RF channel;

determining whether an updated CDM is available; and acquiring the desired content on the selected RF channel using the selected descrambling sequence identified by the selected descrambling sequence identifier when the updated CDM is not available.

20. The method of claim 19, wherein said receiving comprises receiving the CDM over a control channel.

21. The method of claim 19, wherein said detecting comprises detecting the RF channel switch event when it is triggered by at least one of a user request and a program request for the desired content.

22. The method of claim 19, wherein said detecting comprises:

receiving a request to acquire the desired content; and determining the selected RF channel based on the desired content.

23. The method of claim 19, wherein the selected descrambling sequence identifier comprises at least one of a wide area sequence identifier (WID) and a local area sequence identifier (LID).

24. The method of claim 19, wherein determining whether the updated CDM is available comprises:

determining whether the updated CDM is available based on whether a control channel has been updated.

25. The method of claim 19, further comprising:

receiving the updated CDM, determining an updated RF channel carrying the desired content, and determining a second selected descrambling sequence identifier from the updated CDM based on the updated RF channel, when the updated CDM is available; and acquiring the desired content on the updated RF channel using a second selected descrambling sequence identified by the second selected descrambling sequence identifier when the updated CDM is available.

26. An apparatus for RF channel switching in a multi-frequency network, the apparatus comprising:

input logic configured to receive a channel description message (CDM) that associates at least one descrambling sequence identifier with each radio frequency (RF) channel available in a local operations infrastructure (LOI);

processing logic configured to detect an RF channel switch event that identifies a selected RF channel;

messaging logic configured to determine a selected descrambling sequence identifier from the CDM based on the selected RF channel;

determining logic configured to determine whether a new CDM is available; and channel switch logic configured to switch to the selected RF channel, wherein the selected descrambling sequence identifier identifies a selected descrambling sequence to descramble desired content carried on the selected RF channel and to acquire the desired content on the selected RF channel using the selected descrambling sequence identifiers when the new CDM is not available.

27. The apparatus of claim 26, wherein said input logic is configured to receive the CDM over a control channel.

28. The apparatus of claim 26, wherein said processing logic is configured to detect the RF channel switch event when it is triggered by at least one of a user request and a program request for the desired content.

29. The apparatus of claim 26, wherein said processing logic is configured to receive a request to acquire the desired content and to determine the selected RF channel based on the desired content.

30. The apparatus of claim 26, wherein the selected descrambling sequence identifier comprises at least one of a wide area sequence identifier (WID) and a local area sequence identifier (LID).

31. An apparatus for RF channel switching in a multi-frequency network, the apparatus comprising:

means for receiving a channel description message (CDM) that associates at least one descrambling sequence identifier with each radio frequency (RF) channel available in a local operations infrastructure (LOI);

means for detecting a channel switch event that identifies a selected RF channel;

means for determining a selected descrambling sequence identifier from the CDM based on the selected RF channel;

means for switching to the selected RF channel wherein the selected descrambling sequence identifier identifies a selected descrambling sequence to descramble desired content carried on the selected RF channel;

means for determining whether an updated CDM is available;

means for receiving the updated CDM and determining a second selected descrambling sequence identifier from the updated CDM, when the updated CDM is available; and means for acquiring the desired content on the selected RF channel using the second selected descrambling sequence identified by the second scrambling sequence identifier when the updated CDM is received, otherwise acquiring the desired content on the selected RF channel using the selected descrambling sequence identified by the selected descrambling sequence identifier.

32. The apparatus of claim 31, wherein said means for receiving comprises means for receiving the CDM over a control channel.

33. The apparatus of claim 31, wherein said means for detecting comprises means for detecting the channel switch event when it is triggered by at least one of a user request and a program request for the desired content.

34. The apparatus of claim 31, wherein said means for detecting comprises:

means for receiving a request to acquire the desired content; and means for determining the selected RF channel based on the desired content.

35. The apparatus of claim 31, wherein the selected descrambling sequence identifier comprises at least one of a wide area sequence identifier (WID) and a local area sequence identifier (LID).

36. The apparatus of claim 31, wherein in said means for determining whether the updated CDM is available further comprises:

means for determining whether the updated CDM is available based on whether a control channel has been updated.

37. The apparatus of claim 31, wherein in said means for receiving the updated CDM further comprises:

means for receiving the updated CDM;

means for determining an updated RF channel carrying the desired content; and means for determining the second selected descrambling sequence identifier from the updated CDM based on the updated RF channel.

38. A non-transitory computer readable medium embodied with a computer program product comprising computer executable codes for RF channel switching in a multi-frequency network, the computer program product comprising:

a first set of codes for causing a computer to receive a channel description message (CDM) that associates at least one descrambling sequence identifier with each radio frequency (RF) channel available in a local operations infrastructure (LOI);

a second set of codes for causing the computer to detect an RF channel switch event that identifies a selected RF channel;

a third set of codes for causing the computer to determine a selected descrambling sequence identifier from the CDM based on the selected RF channel;

a fourth set of codes for causing the computer to switch to the selected RF channel wherein the selected descrambling sequence identifier identifies a selected descrambling sequence to descramble desired content carried on the selected RF channel;

a fifth set of codes for causing the computer to determine whether an updated CDM is available;

a sixth set of codes for causing the computer to receive the updated CDM, and to determine a second selected descrambling sequence identifier from the updated CDM, when the updated CDM is available; and a seventh set of codes for causing the computer to acquire the desired content on the selected RF channel using the second selected descrambling sequence identified by the second scrambling sequence identifier when the updated CDM is received.

39. The non-transitory computer readable medium of claim 38, wherein said first set of codes is configured to cause the computer to receive the CDM over a control channel.

40. The non-transitory computer readable medium of claim 38, wherein said second set of codes is configured to cause the computer to detect the channel switch event when it is triggered by at least one of a user request and a program request for the desired content.

41. The non-transitory computer readable medium of claim 38, wherein said second set of codes is configured to cause the computer to receive a request to acquire the desired content, and determine the selected RF channel based on the desired content.

42. The non-transitory computer readable medium of claim 38, wherein the selected descrambling sequence identifier comprises at least one of a wide area sequence identifier (WID) and a local area sequence identifier (LID).

43. The non-transitory computer readable medium of claim 38, wherein said seventh set of codes is further configured for causing the computer to:
acquire the desired content using the selected descrambling sequence identified by the selected descrambling sequence identifier when the updated CDM is not received.

44. The non-transitory computer readable medium of claim 38, wherein said sixth set of codes is further configured for causing the computer to:
determine an updated RF channel carrying the desired content;
determine the second selected descrambling sequence identifier from the updated CDM based on the updated RF channel.

45. At least one integrated circuit configured to perform a method for RF channel switching in a multi-frequency network, the at least one integrated circuit comprising:
a first module configured to receive a channel description message (CDM) that associates at least one descrambling sequence identifier with each radio frequency (RF) channel available in a local operations infrastructure (LOI), wherein the CDM is received via a control channel;
a second module configured to detect a channel switch event that identifies a selected RF channel;
a third module configured to determine a selected descrambling sequence identifier from the CDM based on the selected RF channel;
a fourth module configured to switch to the selected RF channel wherein the selected descrambling sequence identifier identifies a selected descrambling sequence to descramble desired content carried on the selected RF channel; and
a fifth module configured to determine whether the control channel has been updated, and acquire the desired content on the selected RF channel using the selected descrambling sequence identified by the selected descrambling sequence identifier when the control channel has not been updated.

46. The at least one integrated circuit of claim 45, wherein said first module is configured to receive the CDM over a control channel.

47. The at least one integrated circuit of claim 45, wherein said second module is configured to detect the channel switch event when it is triggered by at least one of a user request and a program request for the desired content.

48. The at least one integrated circuit of claim 45, wherein said second module is configured to receive a request to acquire the desired content and to determine the selected RF channel based on the desired content.

49. The at least one integrated circuit of claim 45, wherein the selected descrambling sequence identifier comprises at least one of a wide area sequence identifier (WID) and a local area sequence identifier (LID).

50. The at least one integrated circuit of claim 45, wherein said fifth module is further configured to:
determine whether the control channel has been updated based on overhead information.

51. The at least one integrated circuit of claim 45, wherein said fifth module is further configured to:
determine that the control channel has been updated;
receive an updated CDM message;
determine an updated RF channel carrying the desired content;
determine a second selected descrambling sequence identifier from the updated CDM based on the updated RF channel; and
acquire the desired content on the updated RF channel using a second selected descrambling sequence identified by the second selected descrambling sequence identifier.

52. The apparatus of claim 26, wherein the determining logic is configured to determine whether the new CDM is available based on whether a control channel has been updated.

53. The apparatus of claim 26, wherein
the input logic is configured to receive the new CDM, when the new CDM is available,
the processing logic is configured to determine an updated RF channel carrying the desired content, and determine a second selected descrambling sequence identifier from the updated CDM based on the updated RF channel, when the new CDM is available, and
the channel switch logic is configured to acquire the desired content on the updated RF channel using a second selected descrambling sequence identified by the second selected descrambling sequence identifier, when the new CDM is available.

* * * * *